(12) United States Patent
Guo et al.

(10) Patent No.: US 8,692,185 B2
(45) Date of Patent: Apr. 8, 2014

(54) METHOD AND SYSTEM OF DETERMINING A PARAMETER ASSOCIATED WITH A FORMATION CORRECTED FOR NEUTRONS PRODUCED

(75) Inventors: Weijun Guo, Katy, TX (US); Stephen A. Zannoni, Houston, TX (US); Carlos E. Haramboure, Houston, TX (US); Jerome A. Truax, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 13/808,413

(22) PCT Filed: Jul. 21, 2010

(86) PCT No.: PCT/US2010/042683
§ 371 (c)(1),
(2), (4) Date: Jan. 4, 2013

(87) PCT Pub. No.: WO2012/011898
PCT Pub. Date: Jan. 26, 2012

(65) Prior Publication Data
US 2013/0105680 A1 May 2, 2013

(51) Int. Cl.
*G01V 5/10* (2006.01)
(52) U.S. Cl.
USPC .................................................. 250/269.4
(58) Field of Classification Search
USPC ........................................ 250/269.4, 269.6
See application file for complete search history.

(56) References Cited

U.S. PATENT DOCUMENTS

| 3,102,198 | A | * | 8/1963 | Bonner ................... 376/153 |
| 3,156,822 | A | | 11/1964 | Tittman |
| 3,219,820 | A | | 11/1965 | Hall |
| 3,932,747 | A | | 1/1976 | Sherman |
| 3,946,226 | A | | 3/1976 | Smith, Jr. |
| 4,055,763 | A | | 10/1977 | Antkiw |

(Continued)

FOREIGN PATENT DOCUMENTS

| EP | 0552073 | 7/1993 |
| GB | 2427024 | 12/2006 |
| WO | 2007015953 | 2/2007 |

OTHER PUBLICATIONS

Schweitzer, J.S. et al. Gamma Ray Spectroscopy Tool: Environmental Corrections. Journal of Petroleum Technology. pp. 1527-1534. Sep. 1984.

(Continued)

*Primary Examiner* — David Porta
*Assistant Examiner* — Carolyn Igyarto
(74) *Attorney, Agent, or Firm* — Mark E. Scott; Conley Rose, P.C.

(57) ABSTRACT

Determining a parameter associated with a formation corrected for neutrons produced. At least some of the illustrative embodiments are methods including: disposing a logging tool within a borehole, the borehole penetrates a formation; producing neutrons by a neutron source within the logging tool; detecting neutrons produced by the neutron source, the detecting by a neutron detector; creating an indication of a number of neutrons produced by the neutron source, the indication based only on neutrons detected that have not interacted with other elements before entering the neutron detector; obtaining a count rate of a gamma detector responsive to the production of neutrons by the neutron source; and determining a parameter associated with the formation based on the count rate and on the indication of the number of neutrons produced.

24 Claims, 8 Drawing Sheets

(56) References Cited

U.S. PATENT DOCUMENTS

| | | | |
|---|---|---|---|
| 4,078,174 | A | 3/1978 | Goldman |
| 4,122,339 | A | 10/1978 | Smith, Jr. et al. |
| 4,122,340 | A | 10/1978 | Smith, Jr. et al. |
| 4,134,011 | A | 1/1979 | Smith, Jr. et al. |
| 4,135,087 | A | 1/1979 | Oliver et al. |
| 4,239,965 | A | 12/1980 | Oliver et al. |
| 4,268,749 | A | 5/1981 | Mills, Jr. |
| 4,297,575 | A | 10/1981 | Smith, Jr. et al. |
| 4,379,229 | A | 4/1983 | Givens |
| 4,387,302 | A | 6/1983 | Givens |
| 4,430,567 | A | 2/1984 | Oliver et al. |
| 4,605,854 | A | 8/1986 | Smith, Jr. |
| 4,645,926 | A | 2/1987 | Randall |
| 4,656,354 | A | 4/1987 | Randall |
| 4,661,701 | A | 4/1987 | Grau |
| 4,736,204 | A | 4/1988 | Davison |
| 4,928,088 | A | 5/1990 | Jorion et al. |
| 4,972,082 | A | 11/1990 | Loomis |
| 4,992,787 | A | 2/1991 | Helm |
| 5,021,653 | A | 6/1991 | Roscoe et al. |
| 5,105,080 | A | 4/1992 | Stoller et al. |
| 5,374,823 | A | 12/1994 | Odom |
| 5,422,480 | A | 6/1995 | Schultz |
| 5,525,797 | A | 6/1996 | Moake |
| 5,528,029 | A | 6/1996 | Chapellat et al. |
| 5,608,214 | A | 3/1997 | Baron et al. |
| 5,814,988 | A | 9/1998 | Itskovich et al. |
| 5,817,267 | A | 10/1998 | Covino et al. |
| 5,825,024 | A | 10/1998 | Badruzzaman |
| 5,900,627 | A | 5/1999 | Odom et al. |
| 6,124,590 | A | 9/2000 | Mickael |
| 6,207,953 | B1 | 3/2001 | Wilson |
| 6,215,304 | B1 | 4/2001 | Slade |
| 6,246,236 | B1 | 6/2001 | Poitzsch et al. |
| 6,289,283 | B1 | 9/2001 | Plasek |
| 6,376,838 | B1 | 4/2002 | Odom |
| 6,754,586 | B1 | 6/2004 | Adolph et al. |
| 6,831,571 | B2 | 12/2004 | Bartel |
| 6,851,476 | B2 | 2/2005 | Gray et al. |
| 6,967,589 | B1 | 11/2005 | Peters |
| 7,117,092 | B2 | 10/2006 | Jacobson |
| 7,253,402 | B2 | 8/2007 | Gilchrist et al. |
| 7,294,829 | B2 | 11/2007 | Gilchrist |
| 7,361,886 | B2 | 4/2008 | Stoller et al. |
| 7,361,887 | B2 | 4/2008 | Trcka et al. |
| 7,365,307 | B2 | 4/2008 | Stoller et al. |
| 7,365,308 | B2 | 4/2008 | Trcka et al. |
| 7,372,018 | B2 | 5/2008 | Trcka et al. |
| 7,491,929 | B2 | 2/2009 | Truax |
| 2003/0178560 | A1 | 9/2003 | Odom et al. |
| 2005/0067160 | A1 | 3/2005 | Jacobson |
| 2005/0139759 | A1 | 6/2005 | Pitts et al. |
| 2006/0226351 | A1 | 10/2006 | Stoller et al. |
| 2006/0284066 | A1 | 12/2006 | Jacobson |
| 2007/0023626 | A1 | 2/2007 | Riley et al. |
| 2010/0019138 | A1 | 1/2010 | Galford et al. |
| 2012/0059587 | A1* | 3/2012 | Marsh et al. ............ 702/8 |

OTHER PUBLICATIONS

Hertzog, R. et al. Geochemical Logging with Spectrometry Tools. SPE Formation Evaluation. pp. 153-162. Jun. 1988. SPE 16792. Presented at SPE Annual Technical Conference and Exhibition; Dallas, Texas; Sep. 27-30, 1987.

Pemper, R. et al. A New Pulsed Neutron Sonde for Derivation of Formation Lithology and Mineralogy. SPE 102770. Presented at 2006 SPE Annual Technical Conference and Exhibition; San Antonio, Texas. Sep. 24-27, 2006.

Briesmeister, J.F., ed. MCNP—A General Monte Carlo N-Particle Transport Code. Version 4C. LA-13709-M Manual. 2000.

Jacobson, L.A. et al. Intrinsic Capture Cross-Section and Porosity Transform for the TMD-L Pulsed Neutron Capture Tool. SPE 30597. Society of Petroleum Engineers, Inc. 1995. Presented at SPE Annual Technical Conference and Exhibition; Dallas, TX; Oct. 22-25, 1995.

Badruzzaman, A. et al. Is Accurate Gas/Steam Determination Behind Pipe Feasible with Pulsed Neutron Measurements? SPE 110098. SPE Asia Pacific Oil and Gas Conference; Jakarta, Indonesia. Oct. 30-Nov. 1, 2007.

Badruzzaman, A. et al. Multi-Sensor Through-Casing Density and Saturation Measurement Concepts with a Pulsed Neutron Source: A Modeling Assessment. SPE 89884. Society of Petroleum Engineers, Inc. 1994. SPE International Petroleum Conference; Puebla, Mexico; Nov. 8-9, 2004.

Badruzzaman, A. et al. Progress and Future of Pulsed Neutron Technology in Oil Field Management. SPE 49228. Society of Petroleum Engineers, Inc. 1998. SPE Annual Technical Conference and Exhibition; New Orleans, Louisiana; Sep. 27-30, 1998.

Odom, R. et al. Design and Initial Field-Test Results of a New Pulsed-Neutron Logging System for Cased Reservoir Characterization. SPWLA 2008, Paper O. Society of Petrophysicists and Well Log Analysts, 2008. Presented at SPWLA 49th Annual Logging Symposium; Edinburgh, Scotland; May 25-28, 2008.

Scheibal, J.R. et al. Differentiation of Hydrocarbon Type in Gulf of Mexico Clastic Reservoirs by Inelastic Pulsed Neutron Capture Data. SPE 24737. SPE Formation Evaluation, Jun. 1996. First presented at 1992 SPE Annual Technical Conference and Exhibition; Washington, DC; Oct. 4-7, 1992.

Office Action issued Sep. 7, 2007 in U.S. Appl. No. 11/467,692.
Office Action issued Jan. 22, 2008 in U.S. Appl. No. 11/467,692.
Office Action issued Jun. 10, 2008 in U.S. Appl. No. 11/467,692.
Office Action issued Dec. 8, 2008 in U.S. Appl. No. 11/467,692.
Office Action issued Apr. 6, 2009 in U.S. Appl. No. 11/467,692.
International Search Report and Written Opinion issued Apr. 29, 2011 in International Application No. PCT/US2010/042683.

Scheibal, J.R. et al. Differentiation of Hydrocarbon Type in Gulf of Mexico Clastic Reservoirs by Inelastic Pulsed Neutron Capture Data. SPE Formation Evaluation, Jun. 1996 (SPE 24737).

International Search Report issued Feb. 25, 2008 in International Application No. PCT/US2007/072502.

First Examiner's Report issued Sep. 27, 2011 in Canadian Patent Application No. 2,657,581.

Streeter, R.W. et al. Cased Hole Exploration: Modern Pulsed Neutron Techniques for Locating By-Passed Hydrocarbons in Old Wells. SPE 35162. SPE Permian Basin Oil & Gas Recovery Conference; Midland, Texas; Mar. 27-29, 1996. pp. 167-176.

Dresser Atlas. Log Interpretation Charts. Dresser Industries, Inc., USA. 1983. p. 101.

Tittman, J. et al. The Physical Foundations of Formation Density Logging (Gamma-Gamma). Geophysics, vol. XXX, No. 2. Apr. 1965, pp. 284-293.

Odom, Richard C. et al. A New 1.625" Diameter Pulsed Neutron Capture and Inelastic/Capture Spectral Combination System Provides Answers in Complex Reservoirs. SPWLA 35th Annual Logging Symposium; Jun. 19-22, 1994.

Odom, Richard C. Program and Pertinent Slides from a Presentation by Richard C. Odom at SIAM Symposium on Inverse Problems: Geophysical Applications. Dec. 17, 1995.

Randall, Russel R. et al. PDK-100 Log Examples in the Gulf Coast. 26th Annual SPWLA Logging Symposium; Jun. 17-20, 1985.

Randall, Russel R. et al. PDK-100 Enhances Interpretation Capabilities for Pulsed Neutron Capture Logs. 27th Annual SPWLA Logging Symposium; Jun. 9-13, 1986.

Wilson, Robert D. et al. Bulk Density Logging with High-Energy Gammas Produced by Fast Neutron Reactions with Formation Oxygen Atoms. IEEE Nuclear Science Symposium and Medical Imaging Conference Record, vol. 1; Oct. 21-28, 1995.

Schneider, B.D. et al. Using Pulsed Neutron Decay-Spectrum Data and Multi-Inflatable Packer Plugdown Assemblies Improve Oil Production Rates in a Mature CO2 Flood. SPE 35165. SPE Permian Basin Oil & Gas Recovery Conference; Mar. 27-29, 1996; Midland, Texas.

Odom, R.C. et al. Applications and Derivation of a New Cased-Hole Density Porosity in Shaly Sands. SPE 38699. SPE Annual Technical Conference and Exhibition; Oct. 5-8, 1997; San Antonio, Texas.

(56) References Cited

OTHER PUBLICATIONS

Odom, R.C. et al. Shaly Sand Analysis Using Density-Neutron Porosities from a Cased-Hold Pulsed Neutron System. SPE 55641. SPE Rocky Mountain Regional Meeting; May 15-18, 1999; Gillette, Wyoming.

Odom, R.C. et al. A Pulsed Neutron Analysis Model for Carbon Dioxide Floods: Application to the Reinecke Field, West Texas. SPE 59717. SPE Permian Basin Oil & Gas Recovery Conference; Mar. 21-23, 2000; Midland, Texas.

Odom, R.C. et al. Examples of Cased Reservoir Analysis in the Ventura Basin, California. SPE 62850. SPE/AAPG Western Regional Meeting; Jun. 19-23, 2000; Long Beach, California.

Odom, R.C. et al. Assessing the Capabilities of a Cased-Hole Reservoir Analysis System in the Gulf of Thailand. SPE 64404. SPE Asia Pacific Oil and Gas Conference and Exhibition; Oct. 16-18, 2000; Brisbane, Australia.

Odom, R.C. et al. Log Examples with a Prototype Three-Detector Pulsed-Neutron System for Measurement of Cased-Hole Neutron and Density Porosities. SPE 71042. SPE Rocky Mountain Petroleum Technology Conference; May 21-23, 2000; Keystone, Colorado.

Odom, R.C. et al. Improvements in a Through-Casing Pulsed-Neutron Density Log. SPE 71742. SPE Annual Technical Conference and Exhibition; Sep. 30-Oct. 3, 2001; New Orleans, Louisiana.

Neuman, C.H. et al. An Investigation of Density Derived from Pulsed Neutron Capture Measurements. SPE 56647. SPE Annual Technical Conference and Exhibition; Oct. 3-6, 1999; Houston, Texas.

* cited by examiner

METHOD AND SYSTEM OF DETERMINING A PARAMETER ASSOCIATED WITH A FORMATION CORRECTED FOR NEUTRONS PRODUCED

CROSS-REFERENCE TO RELATED APPLICATIONS

None.

BACKGROUND

Pulsed-neutron formation evaluation tools interrogate the formation surrounding the borehole with high energy neutrons produced by a neutron source associated with the tool. Through various types of interactions by the neutrons with elements of the tool, borehole and formation, gamma radiation is created that is incident upon gamma radiation detectors also associated with the tool. Borehole and formation properties can be determined based on the timing of arrival, number of arrivals and/or energy of the gamma radiation.

However, some pulsed-neutron sources are inconsistent in the number neutrons produced from pulse-to-pulse. Thus, a decrease in the amount of gamma radiation sensed by a gamma radiation detector from one interrogation of an earth formation to the next could be caused by a change in a formation property, a change in the number of neutrons produced, or both. Related-art devices attempt to address the neutron source inconsistency by taking ratios of gamma radiation count rates from multiple gamma radiation detectors at multiple axial distances from the neutron source, under the theory the ratios should be less sensitive to neutron source variation. However, while the ratios may be less sensitive, the ratios also dull the sensitivity to formation parameters. Thus, any system or method that helps quantify neutron source inconsistency could improve the sensitivity and accuracy of formation interrogation based on gamma radiation detection.

BRIEF DESCRIPTION OF THE DRAWINGS

For a detailed description of exemplary embodiments, reference will now be made, by way of example only, to the accompanying drawings in which.

NOTATION AND NOMENCLATURE

Certain terms are used throughout the following description and claims to refer to particular system components. As one skilled in the art will appreciate, oilfield service companies may refer to a component by different names. This document does not intend to distinguish between components that differ in name but not function.

In the following discussion and in the claims, the terms "including" and comprising" are used in an inclusive fashion, and thus should be interpreted to mean "including, but not limited to . . . ", Also, the term "couple" or "couples" is intended to mean either an indirect or direct connection. Thus, if a first device couples to a second device, that connection may be through a direct connection or through an indirect connection via other devices and connections.

"Gamma" or "gammas" shall mean energy created and/or released due to neutron interaction with atoms, and in particular atomic nuclei, and shall include such energy whether such energy is considered a particle (i.e., gamma particle) or a wave (i.e., gamma ray or wave).

"About" shall mean, with respect to a recited distance, within ten percent of the recited distance.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
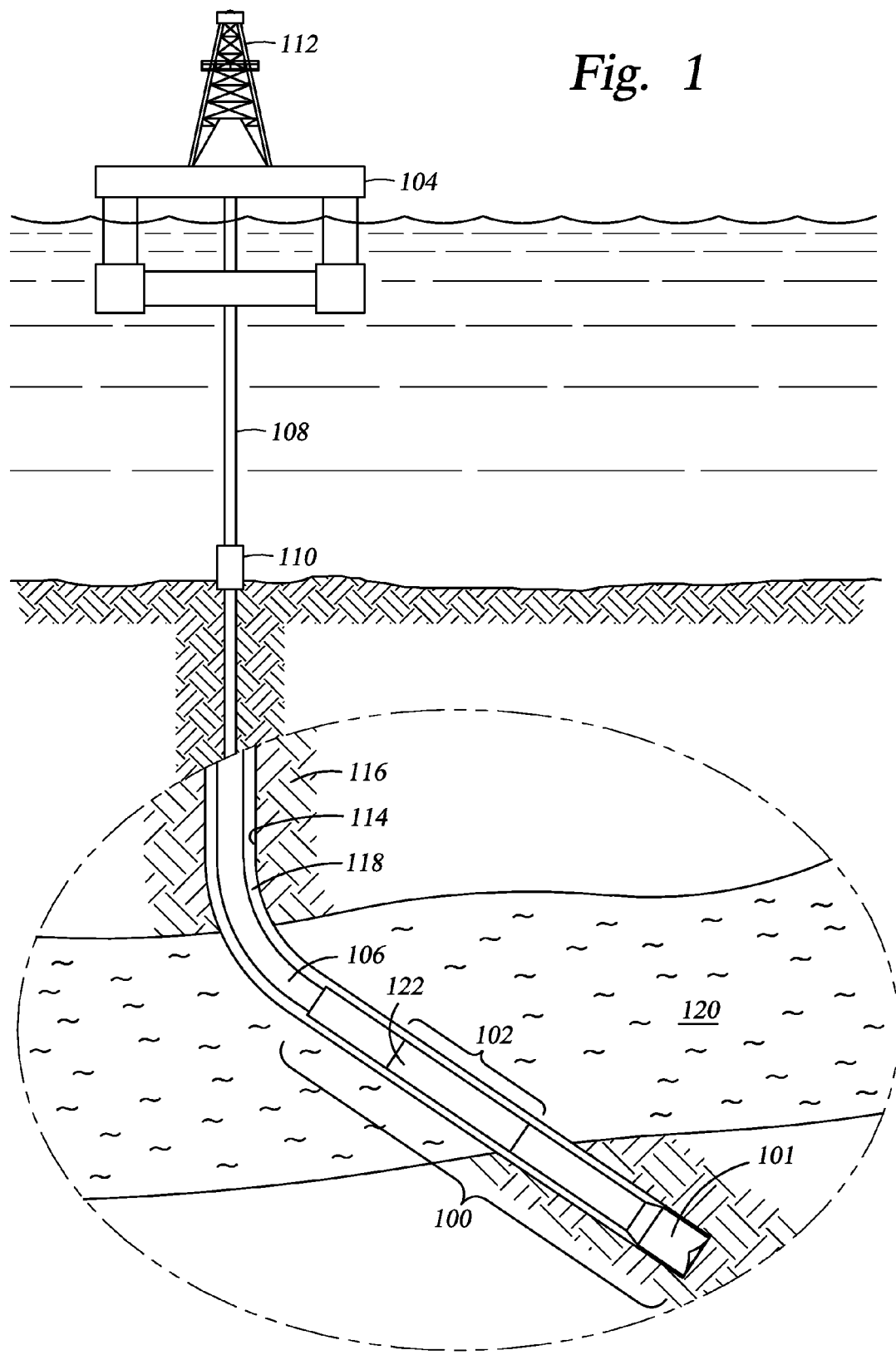
FIG. 1 shows a system in accordance with at least some embodiments.

FIG. 1 shows a bottom hole assembly 100 for a drilling operation, where the bottom hole assembly 100 comprises a pulsed-neutron formation evaluation tool 102 and a drill bit 101. The bottom hole assembly 100 is lowered from a drilling platform 104, such as a ship or other drilling platform, by way of a drill string 106. The drill string 106 extends through a riser 108 and a well head 110. Drilling equipment supported within and around derrick 112 rotates the drill string 106 and the drill bit 101, causing the bit 101 to form a borehole 114 through the formation material 116. The volume defined between the drill string 106 and the borehole 114 is referred to as the annulus 118. The borehole 114 penetrates subterranean zones or reservoirs, such as reservoir 120, believed to contain hydrocarbons in a commercially viable quantity. It is also consistent with the teachings herein that the tool 102 is employed in other bottom hole assemblies and with other drilling apparatus in land-based drilling with land-based platforms, as well as offshore drilling as shown in FIG. 1. In addition to the tool 102, the bottom hole assembly 100 may also contain various other systems, such as a down hole drill motor, a rotary steerable tool, a mud pulse telemetry system, and other measuring-while-drilling and/or logging-while-drilling sensors and systems.

In some embodiments, the information gathered by the tool 102 may be stored within the tool 102 and read when the tool 102 is raised to the surface or the platform 104. In other embodiments, some or all the information gathered by the tool may be sent to the surface or platform 104 while the tool 102 is within the borehole 114. For example, some or all the information gathered by the tool 102 may be sent encoded in pressure pulses in the drilling fluid within the drill string 106. In yet still other embodiments, the information gathered by the tool 102 may be sent over a communication pathway embedded within the pipes of the drill string 106, such as by electrical conductors or optical conductors.

The tool 102 may be coupled within the bottom hole assembly 100 by any suitable mechanism. For example, in some embodiments the tool 102 has a threaded male "pin" end connector on one end, and a threaded female "box" end connector on the other end, such that the tool 102 couples to other components of the bottom hole assembly 100. At least a portion of the outer surface 122 forms a pressure vessel within which various components for generating neutrons, detecting neutrons, and detecting gammas are located. Moreover, a fluid conduit (not visible in FIG. 1) may also reside within the outer surface 122, and drilling fluid passes through the fluid conduit on its journey to the drill bit 101.

Figure 2:
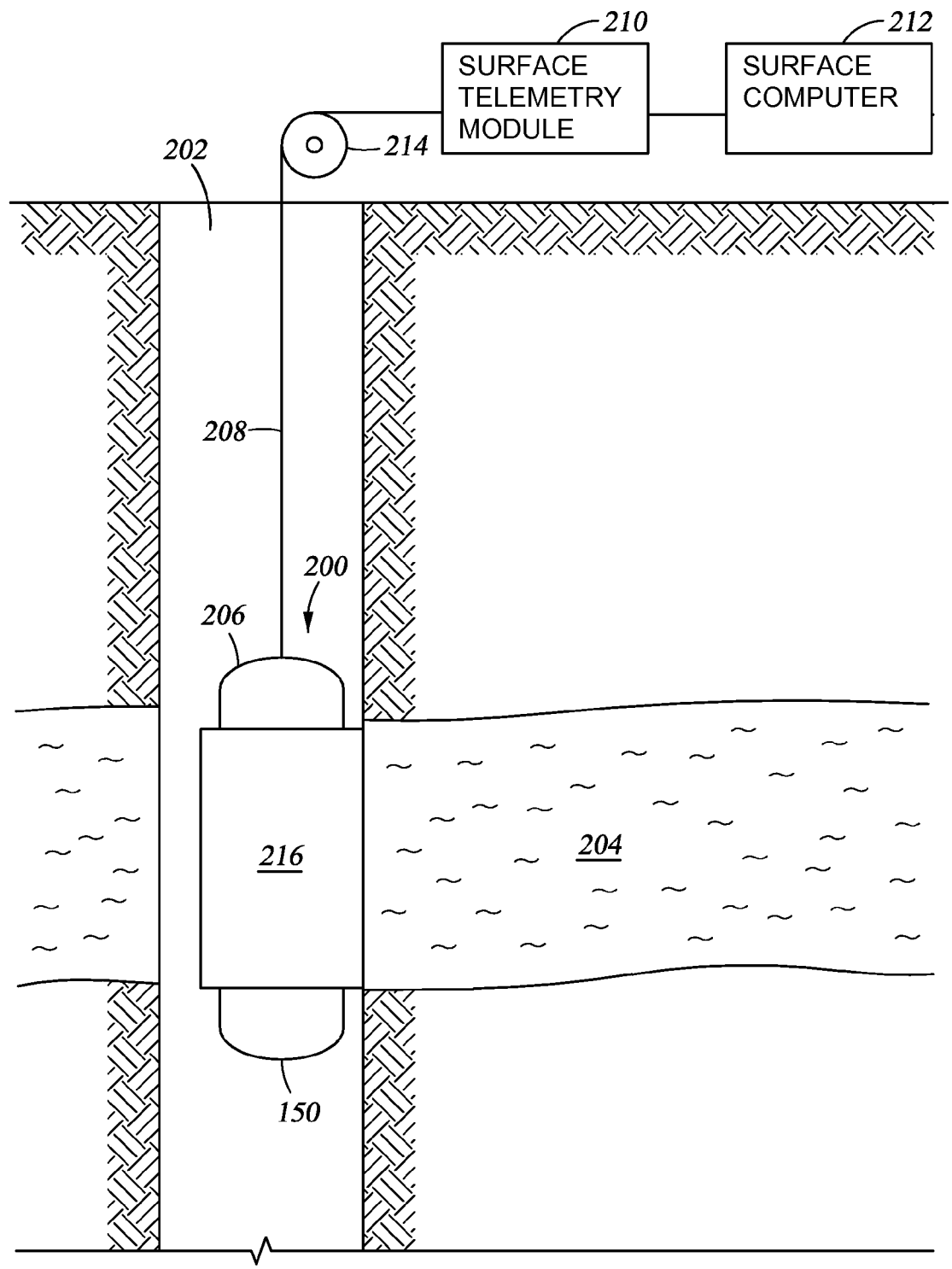
FIG. 2 shows a system in accordance with at least some embodiments.

While in some embodiments the formation evaluation tool is used in drilling operations, in yet still other embodiments the formation evaluation tool is used in wireline logging operations. In particular, FIG. 2 illustrates a wireline logging system that comprises a logging tool 200 placed within a borehole 202 proximate to a formation 204 of interest. The tool 200 comprises a pressure vessel 206 within which various subsystems of the tool 200 reside, and in the illustrative case of FIG. 2 the pressure vessel 206 is suspended within the borehole 202 by a cable 208. Cable 208, in some embodiments a multi-conductor armored cable, not only provides support for the pressure vessel 206, but also in these embodiments communicatively couples the tool 200 to a surface telemetry module 210 and a surface computer 212. The tool 200 may be raised and lowered within the borehole 202 by way of the cable 208, and the depth of the tool 200 within the borehole 202 may be determined by depth measurement system 214 (illustrated as a depth wheel). In some embodiments, the pressure vessel 206 may be covered with a thermal neutron absorptive material 216 (the thickness of which is exaggerated for clarity of the figure); however, in other embodiments the material 216 may be only partially present or omitted altogether.

Figure 3:
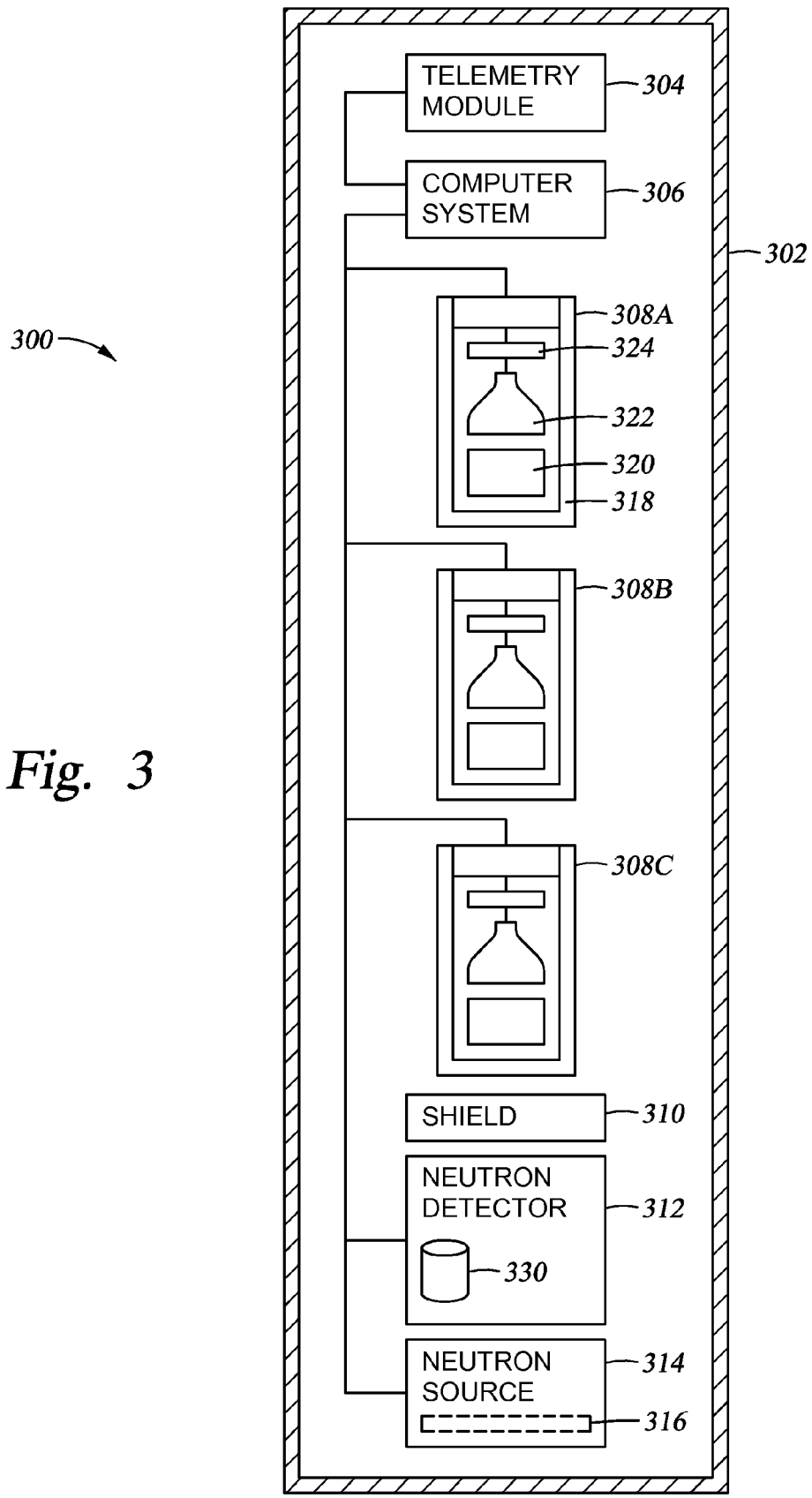
FIG. 3 shows a simplified cross-sectional view of a logging tool in accordance with at least some embodiments.

FIG. 3 shows a simplified partial cross-sectional view of a logging tool 300 in accordance with at least some embodiments. Logging tool 300 is illustrative of either tool 102 in bottom hole assembly 100 or wireline tool 200. In particular, FIG. 3 illustrates a pressure vessel 302 that seals the various internal components from contact with borehole fluids and pressures. Within the pressure vessel 302 illustratively reside a telemetry module 304, computer system 306, a plurality of gamma detectors 308 (in this illustrative case three gamma detectors labeled 308A, 308B and 308C), a neutron shield 310, a neutron detector 312 and a neutron source 314. While the gamma detectors 308 are shown above the neutron source 314, in other embodiments the gamma detectors may be below the neutron source. Gamma detector 308C may be of the order of 12 inches from the neutron source 314. Gamma detector 308B may be on the order of 24 inches from the neutron source 314. Gamma detector 308A may be on the order of 32.5 to 36 inches from the neutron source 314. Other spacing may be equivalently used.

In some embodiments the neutron source 314 is a Deuterium/Tritium neutron generator. However, any neutron source capable of producing and/or releasing neutrons with sufficient energy (e.g., greater than 8 Mega-electron Volt (MeV)) may equivalently used. The neutron source 314, under command from surface computer system 212 (FIG. 2, in the case of wireline tools), or under command from computer system 306 within the tool (in the case of measuring-while-drilling (MWD), logging-while-drilling (LWD) or slickline tools), generates and/or releases energetic neutrons. In the particular case of a Deuterium/Tritium neutron generator, the neutrons are generated based on ions of Deuterium accelerated into collisions with a target 316 (shown in dashed lines, as the target would be within a sealed chamber) coated with Tritium. Alternatively, Tritium ions may be accelerated onto a Deuterium coated target. The collisions fuse the particles creating Helium and a neutron having energy of 14.2 Mega-electron Volts (MeV). Neutrons generated by particle collision with target 316 propagate outward randomly in all directions, and thus the target 316 may be considered a point of emanation of the neutrons produced.

In order to reduce the eradiation of the gamma detectors 308 and other devices by energetic neutrons from the neutron source 314, neutron shield 310 (e.g., HEVIMET® available from General Electric Company of Fairfield, Conn.) separates the neutron source 314 from the gamma detectors 308. Because of the speed of the energetic neutrons (e.g., 30,000 kilometers/second or more), and because of collisions of the neutrons with atomic nuclei that change the direction of movement of the neutrons, a neutron flux is created around the logging tool 300 that extends into the surrounding formation.

Neutrons produced by the source 314 interact with atoms by way of inelastic collisions and/or thermal capture. In the case of inelastic collisions, a neutron inelastically collides with atomic nuclei, a gamma is created (an inelastic gamma), and the energy of the neutron is reduced. The neutron may have many inelastic collisions with the atomic nuclei, each time creating an inelastic gamma and losing energy. At least some of the gammas created by the inelastic collisions are incident upon the gamma detectors 308. One or both of the arrival time of a particular gamma and its energy may be used to determine status as an inelastic gamma.

After one or more inelastic collisions (and corresponding loss of energy) a neutron reaches an energy known as thermal energy (i.e., a thermal neutron). At thermal energy a neutron can be captured by atomic nuclei. In a capture event the capturing atomic nucleus enters an excited state and the nucleus later transitions to a lower energy state by release of energy in the form of a gamma (known as a thermal gamma). At least some of the thermal gammas created by thermal capture are also incident upon the gamma detectors 308. One or both of the arrival time of a particular gamma and its energy may be used to determine its status as a capture gamma. Only inelastic and thermal capture interactions produce gammas, however.

Still referring to FIG. 3, and particularly to gamma detector 308A as indicative of all the gamma detectors 308, a gamma detector comprises an enclosure 318 (shown in cross-section), and within the enclosure 318 resides: a crystal 320 (e.g., a yttrium/gadolinium silicate scintillation crystal); a photo multiplier tube 322 in operational relationship to the crystal 320; and a processor 324 coupled to the photomultiplier tube 322. As gammas are incident upon/within the crystal 320, the gammas interact with the crystal 320 and flashes of light are emitted. Each flash of light itself is indicative of an arrival of a gamma, and the intensity of light is indicative of the energy of the gamma. The output of the photomultiplier tube 322 is proportional to the intensity of the light associated with each gamma arrival, and the processor 324 quantifies the output as gamma energy and relays the information to the surface computer 212 (FIG. 2) by way of the telemetry module 304 in the case of a wireline tool, or to the computer system 306 within the tool in the case of a MWD, LWD or slickline tools.

Neutron sources that produce neutrons by particle acceleration and fusion reactions have an inherent characteristic that the number of neutrons produced may vary significantly from pulse to pulse. The number of gammas that are detected at any of the gamma detectors 308 is a function of not only characteristics of the formation surrounding the borehole, but also the number of neutrons produces. Thus, a change in the number of gammas sensed by a gamma detector 308 from one interrogation of an earth formation to the next interrogation (e.g., at a different depth increment) could be caused by a change in a formation property, a change in the number of neutrons produced, or both.

Some related-art devices attempt to address the neutron source inconsistency by taking ratios of gamma count rates from multiple gamma detectors at multiple axial distances from the neutron source, under the theory the ratios should be less sensitive to neutron source variation. However, while the ratios may be less sensitive to source variation, the ratios also dull the sensitivity to formation parameters of interest. Other related art devices attempt to measure neutrons by way of a neutron detector as an indication of the number of neutrons produced by the neutron source; however, related-art devices that attempt to measure source neutrons have shortcomings in relation to placement of the neutron detector. In particular, related-art devices attempting to measure source neutrons have had to move the neutron detector away from the neutron source in an effort to keep the neutron detector out of a state of saturation. For example, U.S. Pat. No. 4,268,749 to Mills states, "The fast neutron detector 14 needs to be spaced from the neutron source such that it does not go into a state of saturation at the burst repetition rate of the neutron source." In fact, Mills moves the neutron detector so far away that "it is desired that only one neutron count be detected for every 10 bursts from the neutron source."

Still referring to FIG. 3, contrary to the teachings of the related-art noted above, the logging tool 300 in accordance with the various embodiments uses a neutron detector 312 closely spaced with respect to the neutron source. In some embodiments, the neutron detector 312 abuts the neutron source 314, as shown in FIG. 3. More particularly still, the neutron detector 312 in accordance with at least some embodiments is a sealed chamber Helium-3 detector. Specifics regarding the neutron detector 312 are discussed with respect to FIG. 4, but neutrons are detected by their interactions with Helium-3 in the pressure housing 330 of the neutron detector 330. Other components of the neutron detector 312 will be present making the physical dimensions of the neutron detector 312 larger than just the pressure housing 330. Likewise, the neutron source 314 comprises several components defining an overall dimension, but the neutrons emanate from the target 316. Thus, the neutron source 314 is larger than just the target 316. In accordance with at least some embodiments, at least a portion of the internal volume of the sealed pressure housing 330 is within five inches or less from the point of emanation of the neutrons (i.e., the target 316 in the embodiments of FIG. 3). Moreover, in at least some embodiments the neutron detector 312 resides on the same side of the shield 310 as the neutron source, and thus on an opposite side of the shield 310 from the gamma detectors 308.

Figure 4:
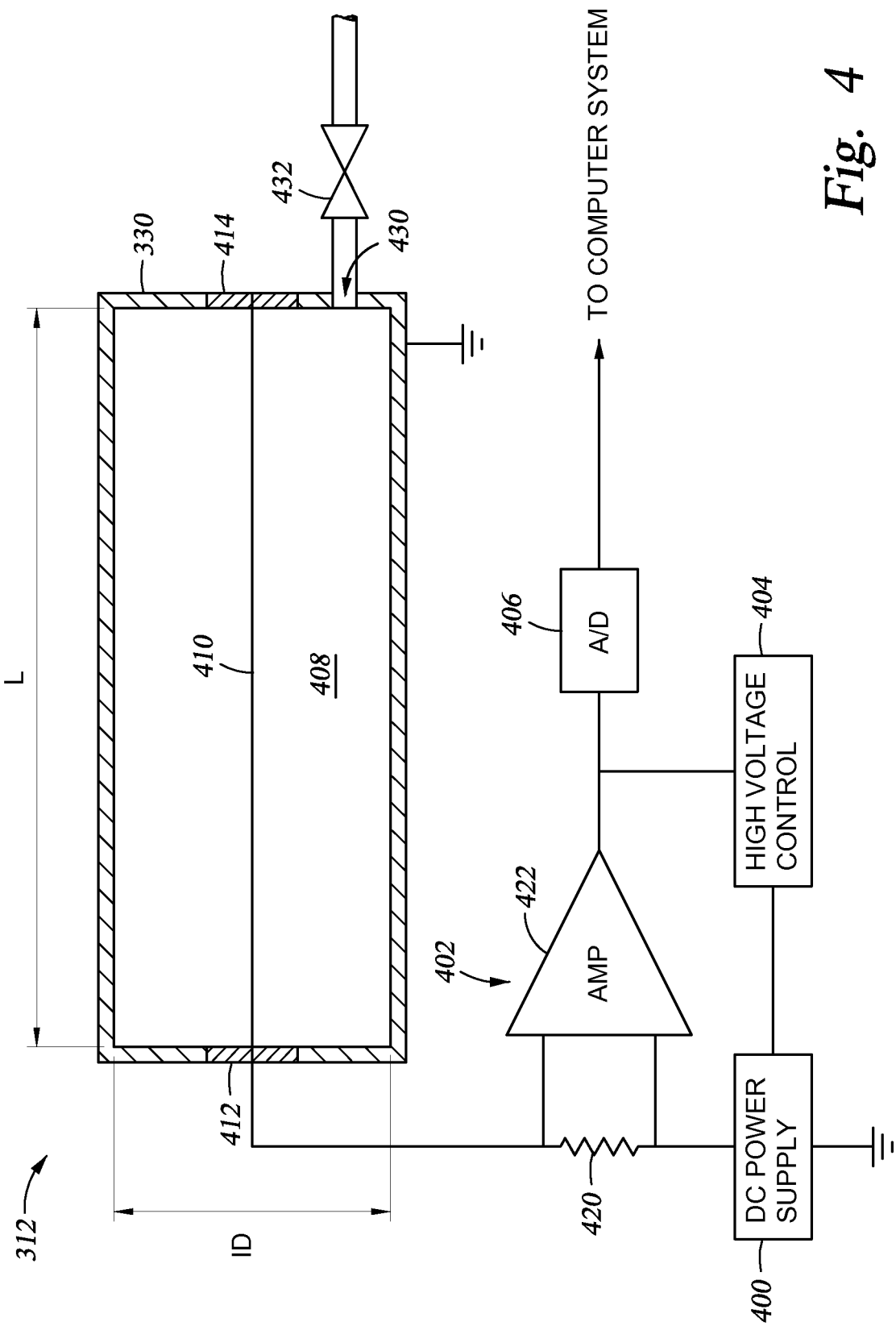
FIG. 4 shows neutron detector in accordance with at least some embodiments.

FIG. 4 shows a neutron detector 312 in accordance with at least some embodiments, where the sealed pressure housing 330 is shown in cross-sectional elevation view, and the illustrative electronics are shown in block diagram form. In particular, the neutron detector 312 comprises sealed pressure housing 330, high voltage direct current (DC) power supply 400, current sense circuit 402, high voltage controller 404, and analog-to-digital (A/D) converter 406. Sealed pressure housing 330 defines an internal volume 408 with a cylindrical cross-section (the cylindrical nature better shown in FIG. 3). In accordance with at least some embodiments, the sealed pressure housing 330 is metallic, and in some cases stainless steel. It is noted that the exterior surface of the sealed pressure housing 330 is likewise cylindrical as illustrated; however, the sealed pressure housing need not itself have a cylindrical exterior surface to define the internal volume 408 with a cylindrical cross-section. The internal volume has an internal diameter (ID) as well as an axial length L. The internal volume 408 is filled with a detector gas (e.g., Helium-3), and in some cases a small percentage of a neutron moderator gas (e.g., carbon dioxide at 5% or less). An electrode 410, as illustrated a wire, is centered within the internal volume 408, and extends along the axis of the internal volume. The wire electrode 410 is electrically isolated from the metallic pressure housing by way of insulators 412 and 414.

In operation, the DC power supply 400 places a bias voltage on the wire electrode 410 with respect to the sealed pressuring housing 330, and in some embodiments the bias voltage is 1000 Volts or more. In order to maintain the bias voltage, a small amount electrical current flows from the DC power supply through the illustrative sense resistor 420 of the current sense circuit 402. The amount of current flowing through the sense resistor 420 is detected as a voltage by amplifier 422. When changes in current are sensed by the high voltage controller 404, in the illustrative case based on the output voltage from the sense amplifier 422 to which the controller 404 is coupled, adjustments are made to the voltage produced by the DC power supply 400 to compensate. Likewise, changes in the current are read by the analog-to-digital converter 406, and passed along to a computer system (such as surface computer system 212 for wireline devices, or computer system 306 for LWD, MWD or slickline devices). Each neutron that enters the sealed pressure housing 330 and interacts with the Helium-3 creates a change in current flow across the sense resistor 420.

In order to keep the neutron detector from saturating, and thus being unable to distinguish arriving neutrons, the neutron detector 312 is designed and constructed not only to take into account the close physical spacing, but also designed and constructed such that changes may be made to "tune" the response of the neutron detector 312. The specification first discusses the physical dimensions of the sealed pressure housing 330, then turns to "tuning".

The sealed pressure housing 330 in accordance with the various embodiments has particular physical dimensions that reduce the possibility of saturation of the detector. In particular, in accordance with at least some embodiments, the internal diameter (ID) of the sealed pressured housing 330 is ¼ inch or less. Moreover, a sealed pressure housing 330 in accordance with the various embodiments has a particular aspect ratio (relationship between the internal diameter and the axial length L of the internal volume). In some embodiments, the axial length L of the internal volume 408 is at least three times the internal diameter of the internal volume. In a particular case, the axial length L of the internal volume 408 is four times the internal diameter. Thus, for a sealed pressure housing 330 having an internal diameter of ¼ inch, the axial length L would be at least ¾ inch, and in some cases one inch.

Another factor in reducing the possibility of saturation during a burst period is the number of molecules of detector gas in the sealed pressure housing 330, which may be adjusted to "tune" the detector. In accordance with embodiments where the gas is Helium-3 (and with the illustrative physical dimensions discussed above), the pressure of the Helium-3 (and moderator gas if used) is ten atmospheres (i.e., 147 pounds per square inch (PSI) absolute, or about 132 PSI gauge) or less. However, for other sizes of detectors, and other placements of detectors, Helium-3 pressure above 10 atmospheres is also contemplated. In accordance with at least some embodiments the pressure of the Helium-3 is adjustable. Still referring to FIG. 3, in some embodiments the sealed pressure housing 330 comprises a port 430 with a valve 432. In cases where the response of the neutron detector 312 is too sensitive, the pressure within the sealed pressure chamber 330 may be reduced. In some cases the pressure reduction takes places after a full or partial disassembly of the tool at the surface, and in other embodiments the pressure may be adjustable when the tool is within a borehole.

As mentioned above, each neutron that enters the sealed pressure housing 330 and interacts with Helium-3 is detected, and the interaction may take one or more forms. Neutrons with high energy may collide with one or more Helium-3 nuclei in such a way that each Helium-3 nucleus recoils (i.e., elastic scattering). The recoil frees electrons and creates a ion of the Helium-3 nucleus. The charged particles are then accelerated within the voltage potential between the wire electrode 410 and the sealed pressure housing 330. Neutrons with lower energy may be absorbed by a Helium-3 atom, the Helium-3 atom becoming a Tridium atom and producing a proton. Again, because the voltage potential between the wire electrode 410 and the sealed pressure housing 330, the protons are accelerated. The direction of acceleration of freed electrons, ionic Helium-3 and protons is dependent upon the polarity of the bias voltage applied across the wire electrode 410 to the sealed pressure housing 330; however, regardless of the direction of acceleration, when the various particles (or byproducts of further collisions by the particles) encounter the wire electrode 410 or the sealed pressure housing 330, electrical current through the sense resistor 420 changes resulting in changes in the bias voltage. The changes in current are sensed by the sense circuit 402, and thus not only are modifications made by the controller 404 regarding applied bias voltage, but the changes in current are also read by the analog-to-digital converter 406. Thus, an absolute count of neutrons, regardless of energy, may be made by the neutron detector 312.

However, in accordance with the various embodiments, an indication of neutrons that have not interacted with other elements is of interest, rather than an absolute neutron count (or count rate). In particular, as discussed above a neutron flux is created around the tool during periods of time when the neutron source 314 is producing neutrons. The neutrons may interact with any atom in proximity, including atoms of the structure of the tool, atoms that make up the borehole fluid, atoms that make up the formation surrounding the borehole, and atoms of the hydrocarbons in the formation. The absolute number of neutrons that find their way to the neutron detector 312, and energy of each neutron that finds its way to the neutron detector 312, is dependent not only upon the number of neutrons released by the neutron source, but also on the physical structures and fluids around the tool. Thus, an absolute neutron count rate (regardless of energy) is not a good indication of the number of neutrons released, as even for the same absolute number of neutrons released as between two pulses, different absolute neutron counts (or count rates) may be observed. For this reason, the various embodiments create an indication based on a measure of the number of neutrons detected by the neutron counter that have not interacted with other elements, as the number of neutrons that have not interacted is a better indication of the absolute number of neutrons produced by the neutron source 314. Whether a neutron has interacted with another atom before being detected by the neutron detector 312 is determined, at least in part, based on the energy of the neutron. The measure may be based on only those detections representing neutrons that have not interacted with other elements before entering the neutron detector.

The energy of a neutron detected by the neutron detector 312 is discernable based on the change in current flow detected by the sense circuit 402. In particular, the change in current sensed at the sense resistor 420 (and amplified by the amplifier 422) is a function of the energy of the neutron when it enters the neutron detector 312. For example, a thermal neutron is absorbed, as discussed above, resulting in single proton. By contrast, a neutron having energy of 14.2 MeV may cause the release of many electrons in multiple recoil reactions with multiple Helium-3 atoms, a corresponding set of ionic Helium-3, and possibly followed by a thermal absorption (if the neutron stays within the chamber long enough to reach thermal energy). Thus, an instantaneous change in current flow across the sense resistor 420 indicates that a neutron entered the sealed pressure housing 330 and interacted with a Helium-3 atom, and the magnitude of the instantaneous current flow (i.e., pulse height) is an indication of the energy of the neutron.

In accordance with at least some embodiments, the indication of the number of neutrons produced by the neutron source 314 is thus the number of neutrons detected whose energies indicate that the neutrons did not interact with any other atom before being detected. In particular, neutrons whose energies are detected as at or above a predetermined value are counted as having not interacted with other atoms before entering the sealed pressure housing, and thus contribute to the indication of the number of electrons produced.

However, even for neutrons of exactly the same energy entering the sealed pressure housing 330 and interacting with respective Helium-3 atoms, slightly different energies may be detected. In particular, the amount of energy attributed to a neutron by the neutron detector in a recoil reaction is a function of how directly the neutron strikes a Helium-3 nucleus. A glancing strike from a neutron having an illustrative energy of 14.2 MeV may produce a less ionic Helium-3 atom and/or fewer free electrons than a direct strike from a neutron having the same energy. Thus, a neutron that has a glancing strike will be detected as having less energy than a direct strike.

In accordance with the various embodiments, the predetermined value of energy is selected to make a count of neutrons that have not interacted other atoms before entering the sealed pressure housing, and taking into account variations in energy between direct strikes of an energetic neutron and glancing strikes. For example, in systems where the neutron source 314 produced neutrons having energies of 14.2 MeV, neutrons detected in the neutron detector 312 with energies above 12 MeV are indicative of neutrons that have not interacted with other atoms before entering the sealed pressure housing 330 (and yet take into account reduced indicated energy based on glancing strikes). In some cases, the selected predetermined value may act to discard some sensed neutrons in creating the indication of the number of neutrons produced that otherwise fall into the category of neutrons that have not interacted, but where the sensed energy is low enough that the sensed neutron could have interacted with an atom before being detected (with the chances of discarding an otherwise desirable neutron rising as the energy of neutrons produced by the source goes down (i.e., different type of neutron source used)). While in some embodiments discrimination based on energy of the neutrons is sufficient in determining the indication of the number of neutrons produced, in other embodiments the indication of the number of neutrons produced also has a time component.

Figure 5:
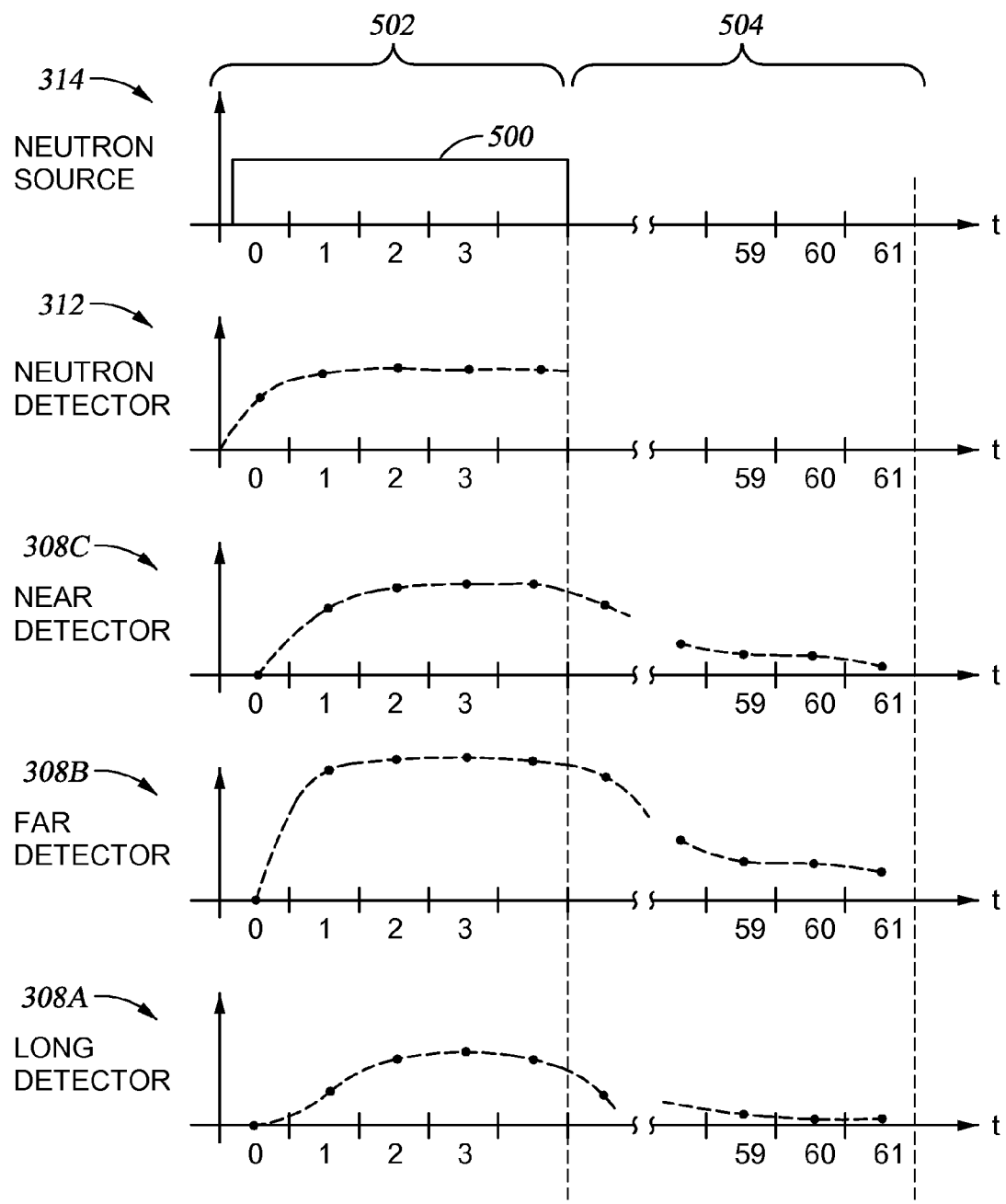
FIG. 5 shows a plurality of graphs of count rate as a function of time in accordance with at least some embodiments.

FIG. 5 shows a plurality of graphs as a function of corresponding time in order to describe how the neutron arrivals and the gamma arrivals are recorded and characterized in accordance with at least some embodiments. In particular, FIG. 5 shows a graph relating to activation of the neutron source 314, neutron count rates for neutron detector 312, and gamma count rates for the near detector 308C, the far detector 308B, and the long detector 308A. The graph with respect to the neutron source 312 is Boolean in the sense that it shows when the neutron source is generating and/or releasing neutrons (i.e., the pulse or burst period 502), and when the neutron source is not (decay period 504). With respect to the neutron source graph, the neutron source is generating and/or releasing neutrons during the asserted state 500, and the neutron source is off during the remaining time. In accordance with the various embodiments, a single interrogation (at a particular borehole depth) comprises activating the neutron source for a predetermined amount of time (e.g., 80 microseconds), counting the number of neutron arrivals during burst period 502, and counting the number of gamma arrivals by at least one of the detectors during the burst period 502 and during the decay period 504. In at least some embodiments, the total amount of time for a single interrogation (i.e., the burst period 502 and decay period 504) may span approximately 1250 microseconds (μs), but other times may be equivalently used.

With respect to counting neutron arrivals, the interrogation time is divided into at least one, and in some cases a plurality, of time slots or time bins. With reference to the graph for the neutron detector 312, in some embodiments the burst period 502 is divided into 8 total time slots or time bins, each time bin spanning 10 μs. Other numbers of time bins, and different time bin lengths, may be equivalently used. Each neutron that arrives within a particular time bin having energy at or above the predetermined value (i.e., that have not interacted with other elements before being detected) increases the count value of neutrons within that time bin. While in some embodiments the actual arrival time of the neutrons within the time bin may be discarded, in other embodiments the actual arrival may be retained and used for other purposes. Further still, while in some embodiments the actual energy of the neutrons within the time bin may be discarded, in other embodiments the actual energy may be retained and used for other purposes.

Still referring to FIG. 5, starting with time bin 0, the neutron detector counts the neutron arrivals and the count value for the particular time bin is increased for each neutron whose energy is at or above the predetermined threshold. Once the time period for the time bin expires, the system starts counting anew the arrivals of neutrons within the next time bin until count values for all illustrative time bins have been obtained. Again, in some embodiments only a single time bin, spanning the entire burst period 502, is used. In accordance with at least some embodiments, neutron arrivals during the decay period 504 are ignored. The count values within each time bin (for a particular burst) are recorded either by way of the surface computer 212 in the case of wireline tools, or by the computer system 306 within the tool in the case of a MWD, LWD or slickline tools.

With respect to counting gamma arrivals by the gamma detectors 308, the burst period is also divided into a plurality of time slots or time bins. With reference to the graph for the long detector 308A as illustrative of all the gamma detectors, in some embodiments the interrogation time (burst period 502 and decay period 504) is divided into 61 total time bins. In accordance with at least some embodiments, the first 32 time bins each span 10 μs, the next 16 time bins each span 20 μs, and the remaining time bins each span 50 μs. Other numbers of time bins, and different time bin lengths, may be equivalently used. Each gamma that arrives within a particular time bin increases the count value of gammas within that time bin. While in some embodiments the actual arrival time of the gammas within the time bin may be discarded, in other embodiments the actual arrival may be retained and used for other purposes. Starting with time bin 0, the gamma detector counts the gamma arrivals and the system increases the count value for the particular time bin for each gamma arrival. Once the time period for the time bin expires, the system starts counting anew the arrivals of gammas within the next time bin until count values for all illustrative 61 time bins have been obtained. In some cases, the system starts immediately again by activating the neutron source and counting further time bins; however, the count values within each time bin are recorded either by way of the surface computer 212 in the case of wireline tools, or by the computer system 306 within the tool in the case of a MWD, LWD or slickline tool.

Illustrative count values for each time bin are shown in FIG. 5 as dots in the center of each time bin. The count value for each time bin is represented by the height of the dot above the x-axis (i.e., the y-axis value). Taking all the count values for a particular detector together, the dots may be connected by an imaginary line (shown in dashed form in FIG. 5) to form a mathematical curve illustrative of the number of arrivals as a function of time detected by the particular detector.

Figure 6:
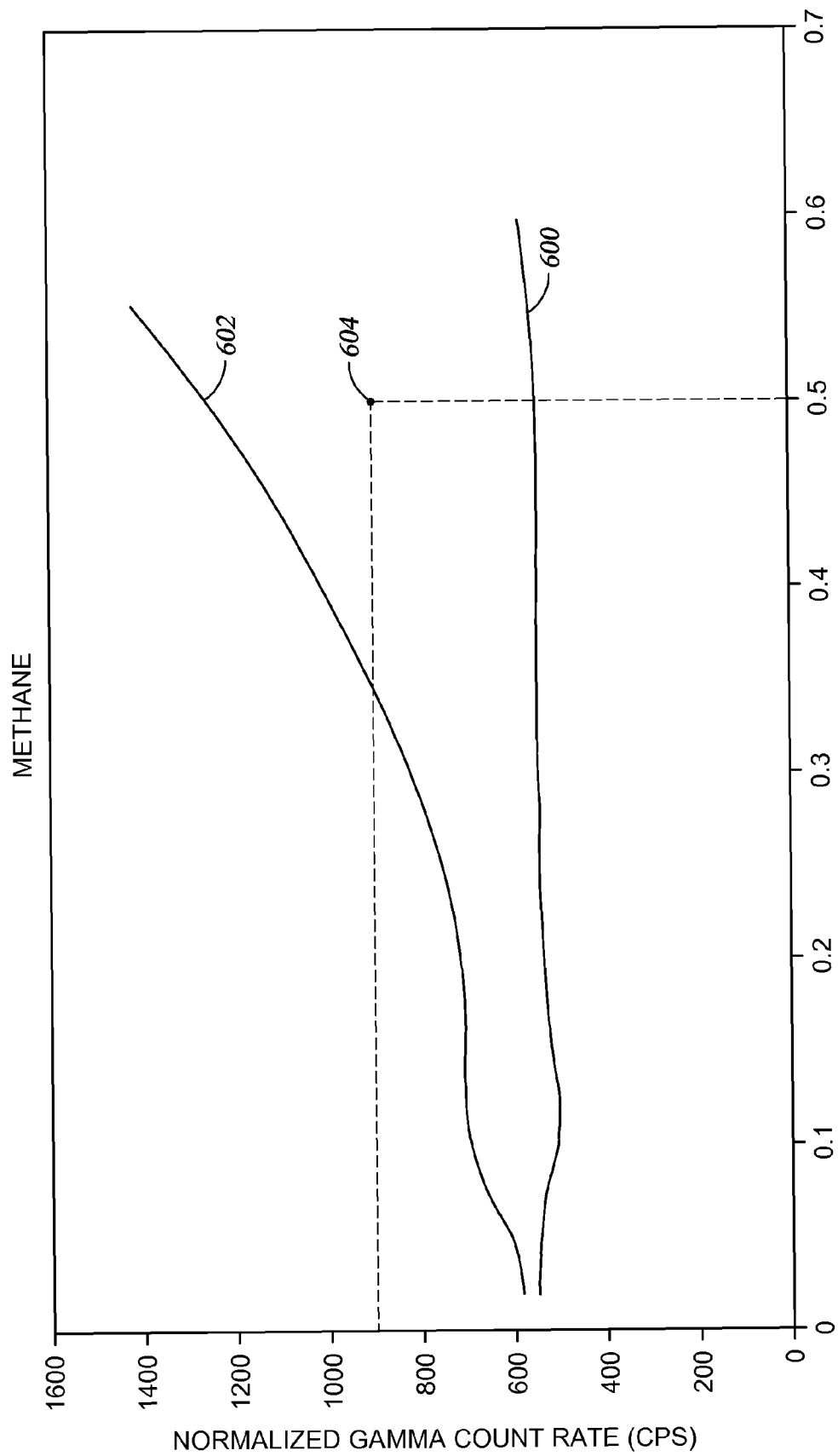
FIG. 6 shows an graph of the relationship between normalized count rates and gas/oil saturation.

In accordance with the various embodiments, the gamma count rates are adjusted based on the indication of the neutrons produced, and then one or more gamma count rates used to determine a parameter associated with the formation (e.g., bulk density, porosity, hydrogen index, gas saturation). As an example, consider gas saturation. Gamma count rates for the long detector 308A are indicative of gas saturation of the formation. In accordance with at least some embodiments, a relationship between count rate for a "standard" neutron output and gas/oil saturation may be developed (e.g., through empirical studies, or by formation simulation). FIG. 6 illustrates a plot that relates a normalized or corrected gamma count rate to gas saturation. In particular, FIG. 6 illustrates line 600 representing 100% gas saturation as a function of porosity (X axis) for an illustrative set of normalized gamma count rates (Y axis). Likewise, line 602 represents 100% oil saturation for the illustrative set of normalized gamma count rates. To determine the gas to oil ratio within a formation, the formation is interrogated by the pulsed-neutron tool, and the tool and/or its related systems determine an indication of the number of neutrons produced, as well as the count rates over the time bins for the gamma detector 308C. For oil/gas saturation, inelastic gammas carry the bulk of the information, and thus an intermediate count rate value may be established as a combination of the count rates during the burst period (the vast majority of which will be inelastic), perhaps modified by the gamma count rates during the decay period (e.g., near the end of the decay period, where count rates represent background radiation). The intermediate count rate may then be adjusted to a "standard" count rate based on the indication of the number of neutrons produced to arrive at the normalized gamma count rate. The normalized gamma count rate may then be plotted, and a ratio of oil and gas determined based on the plotted point. Points landing on the 100% gas saturation line 600 represent 100% gas in the formation, points landing on the 100% oil saturation line 602 represent 100% oil saturation, and points in between represent a saturation between (though not necessarily a linear interpolation). For example, a gamma count rate may be adjusted based on the indication of the neutrons produced to arrive at normalized gamma count rate such as point 604, residing precisely between the 100% gas saturation line 600 and the 100% oil saturation line 602, and for the illustrative particular porosity of the formation of 0.5 pu. Such a normalized gamma count may represent a 50% gas saturation (or, conversely, a 50% oil saturation).

Figure 7:
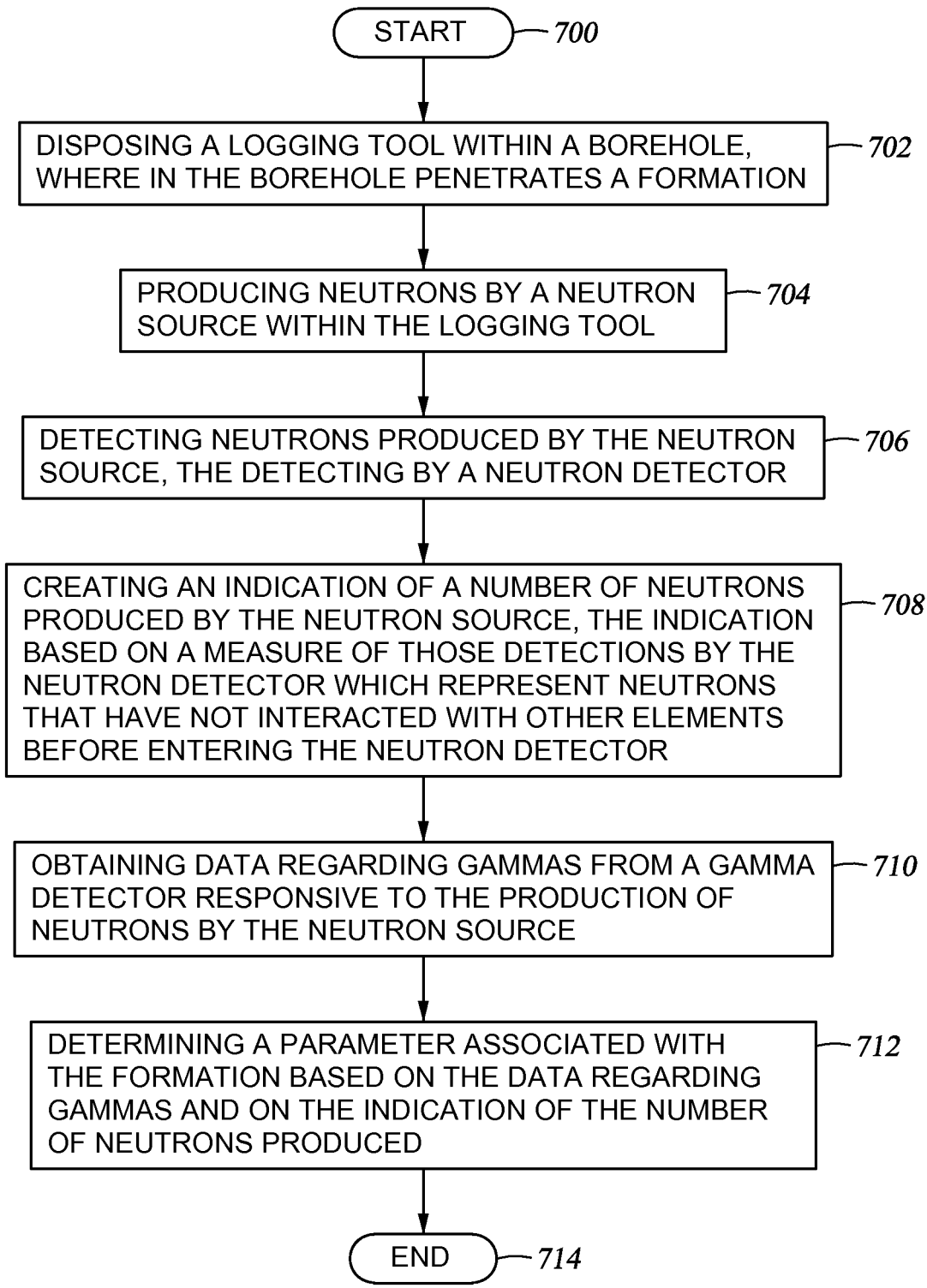
FIG. 7 shows a method in accordance with at least some embodiments.

FIG. 7 shows a method (some or all of which may be implemented by software) in accordance with at least some embodiments. In particular, the method starts (block 700) and comprises: disposing a logging tool within a borehole, wherein the borehole penetrates a formation (block 702); producing neutrons by a neutron source within the logging tool (block 704); detecting neutrons produced by the neutron source, the detecting by a neutron detector (block 706); creating an indication of a number of neutrons produced by the neutron source, the indication based on a measure of those detections by the neutron detector which represent neutrons that have not interacted with other elements before entering the neutron detector (block 708); obtaining data regarding gammas from a gamma detector responsive to the production of neutrons by the neutron source (block 710); and determining a parameter associated with the formation based on the data regarding gammas and on the indication of the number of neutrons produced (block 712). Thereafter, the method ends (block 714).

Figure 8:
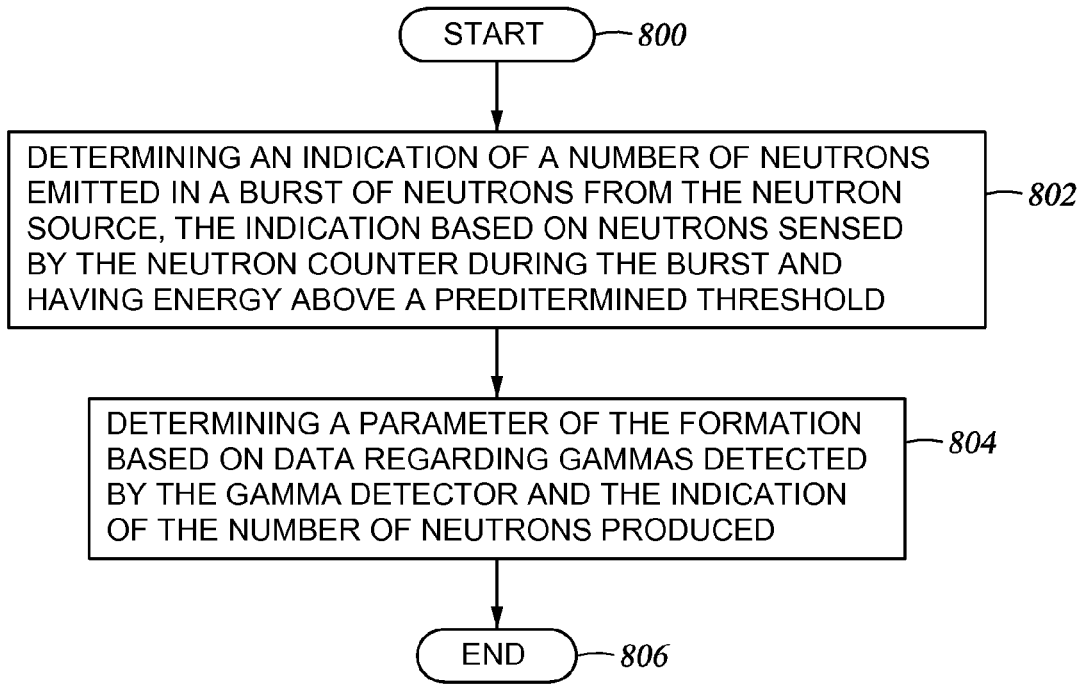
FIG. 8 shows a method in accordance with at least some embodiments.

FIG. 8 shows a method (some or all of which may be implemented by software) in accordance with at least some embodiments. In particular, the method starts (block 800) and comprises: determining an indication of a number of neutrons emitted in a burst of neutrons from the neutron source, the indication based on neutrons sensed by the neutron counter during the burst and having energy above a predetermined threshold (block 802); and determining a parameter of the formation based on data regarding gammas detected by the gamma detector and the indication of the number of neutrons produced (block 804). Thereafter, the method ends (block 806).

Figure 9:
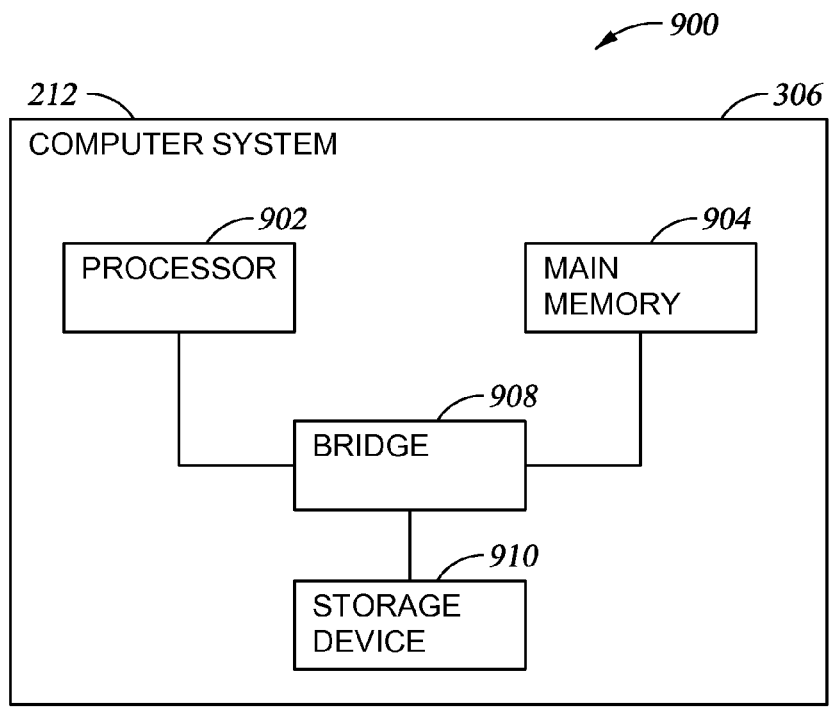
FIG. 9 shows a computer system in accordance with at least some embodiments.

FIG. 9 illustrates in greater detail a computer system 900, which is illustrative of both the surface computer system 212 and the computer system 306. Thus, the computer system 900 described with respect to FIG. 9 could be proximate to the borehole during the time period within which the tool is within the borehole (such as for wireline tools), the computer system 900 could be located at the central office of the oilfield services company, or the computer system 900 could be within the logging tool (such as for LWD, MWD or slickline tools). The computer system 900 comprises a processor 902, and the processor couples to a main memory 904 by way of a bridge device 908. Moreover, the processor 902 may couple to a long term storage device 910 (e.g., a hard drive) by way of the bridge device 908. Programs executable by the processor 902 may be stored on the storage device 910, and accessed when needed by the processor 902. The program stored on the storage device 910 may comprise programs to implement the various embodiments of the present specification, including programs to create counts of neutrons created by the neutron detector, create an indication of the number of neutrons produced by the neutron source, and to determine a parameter of the formation based on gamma count rates adjusted based on the indication of neutrons produced. In some cases, the programs are copied from the storage device 910 to the main memory 904, and the programs are executed from the main memory 904. Thus, both the main memory 904 and storage device 910 are considered computer-readable storage media. The parameters of the formation calculated by the computer system 900 may be sent to a plotter that creates a paper-log, or the values may be sent to a display device which may make a representation of the log for viewing by a geologist or other person skilled in the art of interpreting such logs.

From the description provided herein, those skilled in the art are readily able to combine software created as described with appropriate general-purpose or special-purpose computer hardware to create a computer system and/or computer sub-components in accordance with the various embodiments, to create a computer system and/or computer sub-components for carrying out the methods of the various embodiments and/or to create a non-transitory computer-readable media (i.e., not a carrier wave) that stores a software program to implement the method aspects of the various embodiments.

The above discussion is meant to be illustrative of the principles and various embodiments of the present invention. Numerous variations and modifications will become apparent to those skilled in the art once the above disclosure is fully appreciated. For example, larger sizes of the neutron detector can be used if spacing and gas pressure are accordingly adjusted. Thus, ¼ inch internal diameter is merely illustrative, and larger and/or smaller sizes are contemplated for particular situations. It is intended that the following claims be interpreted to embrace all such variations and modifications.

We claim:

1. A method comprising:
disposing a logging tool within a borehole, wherein the borehole penetrates a formation;
producing neutrons by a neutron source within the logging tool;
detecting neutrons produced by the neutron source, the detecting by a neutron detector having a detection chamber that comprises Helium-3 at a pressure of ten atmospheres or below;
creating an indication of a number of neutrons produced by the neutron source, the indication based on a measure of those detections by the neutron detector which represent neutrons that have not interacted with other elements before entering the neutron detector;
obtaining data regarding gammas from a gamma detector responsive to the production of neutrons by the neutron source;
determining a parameter associated with the formation based on the data regarding gammas and on the indications of the number of neutrons products; and
adjusting the pressure of the Helium-3 of the neutron detector.

2. The method of claim 1, wherein determining the parameter includes adjusting the data regarding gammas based on the indication of the number of neutrons produced, and wherein the data regarding gammas is a count rate of the gamma detector.

3. The method of claim 1, wherein:
producing neutrons further comprises producing neutrons with energies of 14 Mega-electron Volts (MeV) and above; and
creating the indication further comprises creating the indication based only on neutrons detected that have energies of 12 MeV and above.

4. The method of claim 1, wherein detecting neutrons further comprises detecting by the neutron detector having a detection chamber with a cylindrical internal volume, the internal volume having an axial length of one inch or less, and the internal volume having an internal diameter of ¼ inch or less.

5. The method of claim 1, wherein detecting neutrons further comprises detecting by the neutron detector having a detection chamber with a cylindrical internal volume defining an internal diameter, the internal volume having an axial length at least three times the internal diameter.

6. The method of claim 5, wherein detecting neutrons further comprises detecting by the internal volume of the neutron detector having axial length being four times the internal diameter.

7. A system comprising:
a tool configured to be placed within a borehole, the borehole penetrating an earth formation, the tool comprising:
a neutron source operable to emit neutrons resulting from fusion reactions, the neutron source defining a point of emanation of neutrons;
a gamma detector ten inches or more from the neutron source;
a neutron counter comprising:
a sealed pressure housing that defines a cylindrical internal volume, at least a portion of the internal volume being five inches or less from the point of emanation of the neutrons; and
an internal diameter (ID) of the internal volume is ¼ inch or less, and an axial length of the internal volume is one inch or less;
a processor coupled to the gamma detector and the neutron counter;
a non-transitory memory coupled to the processor, the memory storing a program that, when executed by the processor, causes the processor to:
determine an indication of a number of neutrons emitted in a burst of neutrons from the neutron source, the indication based on neutrons sensed by the neutron counter during the burst and having energy above a predetermined threshold; and
determine a parameter of the formation based on data regarding gammas detected by the gamma detector and the indication of the number of neutrons produced.

8. The system of claim 7, wherein the program causes the processor to adjust the data regarding gammas is based on the indication of the number of neutrons produced, and the data regarding gammas is a count rate of the gamma detector.

9. The system of claim 7, wherein the internal volume comprises Helium-3 at a pressure of ten atmospheres or below.

10. The system of claim 7, wherein the predetermined threshold is set so as to determine the indication based on each sensed neutron having an energy that indicates that the neutron has not collided with another particle.

11. The system of claim 7, wherein:
the neutron source is configured to emit neutrons having energy at or above 14 Mega-electron Volts (MeV); and
the predetermined threshold his set so as to determine the indication of the number of neutrons produced during the burst having energies of 12 MeV and above.

12. The system claim 7, wherein:
the gamma detector is 30 inches or more from the neutron source; and
the parameter of the formation to be determined is gas saturation.

13. The system of claim 7, wherein the tool includes a wireline logging pressure vessel, with the neutron source, neutron counter and gamma detector being disposed within the pressure vessel.

14. The system of claim 7, wherein the tool is configured to couple within a drill string.

15. A system comprising:
a tool configured to be placed within a borehole, the borehole penetrating an earth formation, the tool comprising:
a neutron source operable to emit neutrons resulting from fusion reactions, the neutron source defining a point of emanation of neutrons;
a gamma detector ten inches or more from the neutron source;
a neutron counter comprising:
a sealed pressure housing that defines a cylindrical internal volume, at least a portion of the internal volume being five inches or less from the point of emanation of the neutrons; and
Helium-3 within the internal volume, the Helium-3 at a pressure of ten atmospheres or below;
wherein the neutron counter is designed and constructed such that the pressure of the Helium-3 is adjustable;
a processor coupled to the gamma detector and the neutron counter;
a non-transitory memory coupled to the processor, the memory storing a program that, when executed by the processor, cause the processor to:
determine an indication of a number of neutrons emitted in a burst of neutrons from the neutron source, the indication based on neutrons sensed by the neutron counter during the burst and having energy above a predetermined threshold; and
determine a parameter of the formation based on data regarding gammas detected by the gamma detector and the indication of the number of neutrons produced.

16. The system of claim 15, wherein an axial length of the internal volume is at least three times an internal diameter (ID) of the internal volume.

17. The system of claim 16, wherein the axial length of the internal volume is four times an ID of the internal volume.

18. The system of claim 15, wherein the neutron counter is designed and constructed such that the pressure of the Helium-3 is adjustable when the tool is outside the borehole.

19. The system of claim 15, wherein:
the neutron source is configured to emit neutrons having energy at or above 14 Mega-electron Volts (MeV); and
the predetermined threshold his set so as to determine the indication of the number of neutrons produced during the burst having energies of 12 MeV and above.

20. The system claim 15, wherein:
the gamma detector is 30 inches or more from the neutron source; and
the parameter of the formation to be determined is gas saturation.

21. The system of claim 15, wherein the tool includes a wireline logging pressure vessel, with the neutron source, neutron counter and gamma detector being disposed within the pressure vessel.

22. The system of claim 15, wherein the tool is configured to couple within a drill string.

23. The system of claim 15, wherein the predetermined threshold is set so as to determine the indication based on each sensed neutron having an energy that indicates that the neutron has not collided with another particle.

24. The system of claim 15, wherein the program causes the processor to adjust the data regarding gammas is based on the indication of the number of neutrons produced, and the data regarding gammas is a count rate of the gamma detector.

* * * * *